(12) United States Patent
Koopmans et al.

(10) Patent No.: US 11,752,537 B2
(45) Date of Patent: Sep. 12, 2023

(54) METAL PARTS BLANKING PROCESS FOR ROTOR AND STATOR OF AN ELECTRIC MOTOR

(71) Applicant: Robert Bosch GmbH, Stuttgart (DE)

(72) Inventors: Sipke Koopmans, Tilburg (NL); Marco Op Den Velde, Tilburg (NL); Arjen Brandsma, Tilburg (NL)

(73) Assignee: Robert Bosch GmbH, Stuttgart (DE)

( * ) Notice: Subject to any disclaimer, the term of this patent is extended or adjusted under 35 U.S.C. 154(b) by 148 days.

(21) Appl. No.: 17/295,066

(22) PCT Filed: Nov. 20, 2019

(86) PCT No.: PCT/EP2019/025403
§ 371 (c)(1),
(2) Date: May 19, 2021

(87) PCT Pub. No.: WO2020/104059
PCT Pub. Date: May 28, 2020

(65) Prior Publication Data
US 2022/0008980 A1     Jan. 13, 2022

(30) Foreign Application Priority Data
Nov. 20, 2018 (NL) ..................................... 1043083

(51) Int. Cl.
*B21D 28/16*      (2006.01)
*B21D 28/22*      (2006.01)
(Continued)

(52) U.S. Cl.
CPC .............. *B21D 28/16* (2013.01); *B21D 28/22* (2013.01); *B21D 28/26* (2013.01); *H02K 15/03* (2013.01)

(58) Field of Classification Search
CPC ........ B21D 28/16; B21D 28/22; B21D 28/26; H02K 1/16; H02K 1/2766; H02K 15/02; H02K 15/03
See application file for complete search history.

(56) References Cited

U.S. PATENT DOCUMENTS

| | | | |
|---|---|---|---|
| 2019/0151926 A1* | 5/2019 | Koopmans | H02K 15/02 |
| 2019/0312495 A1* | 10/2019 | Senda | H01F 41/02 |
| 2022/0008980 A1* | 1/2022 | Koopmans | H02K 15/03 |

FOREIGN PATENT DOCUMENTS

| | | |
|---|---|---|
| DE | 102013105597 A1 | 12/2014 |
| JP | 101245927 A | 10/1989 |

(Continued)

OTHER PUBLICATIONS

International Search Report and Written Opinion for Application No. PCT/EP2019/025403 dated Apr. 29, 2020 (10 pages).

*Primary Examiner* — Minh N Trinh
(74) *Attorney, Agent, or Firm* — Michael Best & Friedrich LLP

(57) ABSTRACT

The present disclosure concerns a process for the blanking of metal parts (1) from a—layered basic material (51) composed of a number of mutually stacked individual layers (50) placed and clamped between a blanking die (80) and a blank holder (70) of a blanking device (100), wherein a blanking punch (31; 32) of the blanking device (100) is moved relative to the blanking die (80) to cut and separate the metal parts (1) from the basic material (51). According to the present disclosure, such multi-layer blanking process is carried out in two successive stages (I, II), whereof a first stage (I) entails the punching of holes (3) by a first blanking punch (31) without applying a counter punch and whereof a second stage (II) entails the blanking of the metal parts (1) by a second blanking punch (32) while being supported by a counter punch (40).

14 Claims, 4 Drawing Sheets

(51) Int. Cl.
 *B21D 28/26* (2006.01)
 *H02K 15/03* (2006.01)

(56) References Cited

FOREIGN PATENT DOCUMENTS

| JP | 2012050989 A | 3/2012 |
|----|--------------|--------|
| WO | 0059725 A1 | 10/2000 |
| WO | 2017174215 A1 | 10/2017 |
| WO | 2018061529 A1 | 4/2018 |

* cited by examiner

METAL PARTS BLANKING PROCESS FOR ROTOR AND STATOR OF AN ELECTRIC MOTOR

BACKGROUND

The present disclosure relates to a process for the blanking of metal parts, in particular a multi-layer blanking process. The blanking process is, as such, generally known and is broadly applied in the manufacturing of metal parts, in particular for the cutting-out thereof from strip, sheet or plate shaped basic material. In the known blanking process at least the circumference or 2D contour of the metal part is shaped by pressing a correspondingly shaped blanking punch against and through the basic material, which basic material is clamped between a blanking die and a blank holder of a blanking device. The blanking die and the blank holder thereto define a respective cavity that is shaped to accommodate the blanking punch. As the blanking punch is progressively pressed towards and into the cavity of the blanking die by the relative motion there between, edges of the blanking die that defines the said cavity thereof, carves into and finally completely cuts through the basic material, thus separating the metal part from the remainder of the basic material.

In the art it is suggested to improve the process speed, i.e. the production rate of the blanking process for, in particular, relatively thin metal parts by utilising a layered basic material therein. As a result, a number of metal parts is simultaneously blanked with a single stroke of the blanking punch corresponding to the number of layers of the layered basic material. This known, so-called, multi-layer blanking process is for example described in the international patent application WO2017/174215 A1. According to this document, a counter punch is applied on the opposite side of the layered basic material relative to the blanking punch in order to render such multi-layer blanking process feasible in practice, in particular in terms of the typically required surface quality and/or shape accuracy of the cut side faces of the metal parts. This known multi-layer blanking process is particularly suited for the simultaneous manufacture of a number of sheets, i.e. individual lamina, for a laminate, such as rotor or stator laminations for electric motors.

Although representing a step forward in manufacturing technology, the practicality of the multi-layer blanking process proposed by WO2017/174215 A1 appears to be limited in terms of the complexity of the 2D contour of the metal parts that can be manufactured thereby. In particular, a minimum separation is required between two separate cutting lines. This is because a part of the blanking die that is located between, i.e. which separates two adjacent cutting lines requires a minimum size for the adequate strength and/or rigidity. Also in the known multi-layer blanking process, scrap or waste material, i.e. material that is cut loose from both the layered basic material and from the metal part to form a hole inside the metal parts, is held between the blanking die and the blank holder after the blanking stroke, while the metal parts are held between the blanking punch and the counter punch. Thus, after each blanking stroke the scrap material and the metal parts have to be removed from between the blanking die and the blank holder and from between the blanking punch and the counter punch, respectively. Hereto, the blanking device is opened by moving the blank holder and the blanking punch away from the blanking die and the counter punch, such that the scrap material and the metal parts become accessible from the outside of the device. The scrap material must be removed from the blanking device after each blanking stroke reliably and carefully, in particular keeping it separate from the metal parts. In practice, it can be required that the scrap material and the metal parts are removed from the blanking device sequentially rather than simultaneously, which is detrimental to the production speed of the multi-layer blanking process, i.e. which limits the blanking stroke rate of the blanking device.

SUMMARY

The present disclosure sets out to address the limitations of the known multi-layer blanking process and to favourable improve the practicality thereof, in particular in terms of the process speed/production rate and/or of the complexity of the metal parts that are attainable therewith.

According to the present disclosure, the metal parts are blanked in two blanking process stages that are carried out in mutual succession and whereof a first blanking stage entails the cutting-out of a hole or a number of holes in the layered basic material without utilizing a counter punch and whereof a second blanking stage entails the cutting-out of the metal parts from the layered basic material utilizing the counter punch. By not applying a counter punch in the said first blanking stage, the scrap material that is cut loose from the layered basic material therein to form the hole(s), can be favourably discarded through the cavity in the blanking die without first having to open the blanking device by moving the blank holder and the blanking punch away from the blanking die. Thus, when the blanking device is opened, the scrap material has already been removed from it and the metal parts can be removed easily and immediately after such opening of the blanking device.

Rather than exchanging the blanking tools between the said first and second blanking stages, the layered basic material is preferably advanced in-between these blanking stages from a first blanking station without a counter punch, which first blanking station carries out the said first blanking stage, to a second blanking station with the counter punch, which second blanking station carries out the said second blanking stage. Preferably, these two blanking stations are both part of a single blanking device, such that the blanking punches and/or the blanking dies of the two blanking stations are actuated in common by a single actuator of the blanking device, such as a hydraulically or mechanically actuated ram. Moreover, depending on the complexity of the metal part, two or more blanking stations of either type, i.e. respectively with and without a counter punch, can be applied to cut and form the complete 2D contour of the metal part by intermittently advancing the basic material form one blanking station to the next.

Preferably, in the said first blanking stage, pilot holes are cut out of the layered basic material outside the contour of the metal part to be blanked. These pilot holes are favourably used in the said second blanking stage to accurately place and hold the layered basic material in the second blanking station by placing these pilot holes over pilot pins fixed to and protruding from either the blanking die or the blank holder.

In the particular case of the rotor or stator laminations for an electric motor, the inner circumference of the stator sheet and/or the outer circumference of the rotor sheet is provided with—and is thus partly constituted by—radially extending slots of/in the stator of the rotor respectively. In the end-product electric motor these slots of the rotor and/or the stator sheets mutually align in axial direction between adjacent sheets of the respective lamination, to accommodate windings of electric wire and/or bars of aluminium or copper in case of an induction type electric motor. According to the present disclosure, each such circumference slot is pre-formed as a hole in the said first blanking stage, i.e. without using a counter punch, whereas the respective stator or rotor sheets are cut loose from the basic material in the said second blanking stage, whereby a respective side of each hole is removed to open up the holes and form the said slots. This particular arrangement of the multi-layer blanking process is particularly effective in case the circumference slots are provided on a relatively fine scale, in particular on a scale that is difficult or impractical to cut and form in the said second blanking stage.

Additionally or alternatively in case of the said rotor or stator lamination sheets, the rotor sheets are preferably formed from the basic material radially inside the stator sheets. In this way, efficient use is made of the basic material, since—at least for a specific end-product electric motor—the outer circumference of the rotor lamination is typically only slightly smaller than in the inner circumference of the stator lamination to maximize the electromagnetic coupling between them. Preferably in this latter setup of the multi-layer blanking process according to the present disclosure, the rotor sheets and the stator sheets are simultaneously cut loose from the basic material in a single instance of the said second blanking process stage. Although in this setup of the multi-layer blanking process a ring of scrap material is formed between the rotor sheets and the stator sheet, this ring is removed from the blanking device together with the stator and rotor sheets after separating the blank holder and the counter punch from the blanking die and the counter punch respectively. In this setup of the multi-layer blanking process, the ring of scrap material and thus also the radial gap ("air gap") between the rotor and stator laminations can be favourably small, i.e. can be relatively thin, e.g. in the order of less than one up to a couple of millimetres. In this respect it is noted that such small gap is generally preferred, because the efficiency of the electric motor is inversely related to the gap width.

BRIEF DESCRIPTION OF THE DRAWINGS

In the following, the multi-layer blanking process according to the present disclosure is explained further by way of example embodiments and with reference to the drawings, whereof.

DETAILED DESCRIPTION

Figure 1A:
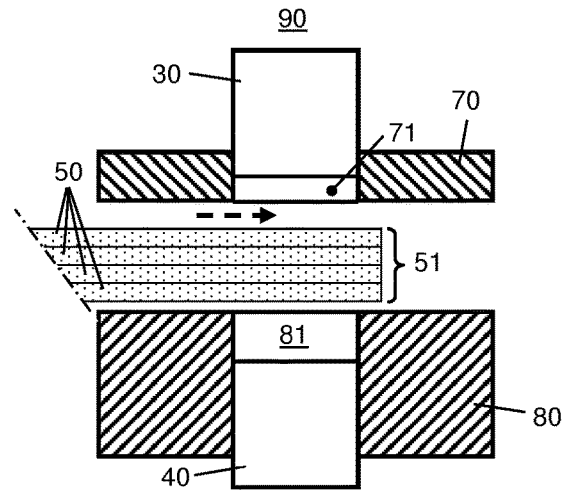
FIGS. 1A to 1F schematically illustrate the known multi-layer fine blanking process for forming metal parts in a cross-section of a multi-layer fine blanking device.

The FIGS. 1A-1F illustrate a multi-layer blanking process for producing a metal part 1. The FIGS. 1A-1F each represent a simplified cross-section of a blanking device 90 that is used to simultaneously, i.e. in a single stroke of the blanking device 90, cut-out a number of such metal parts 1 from a layered basic material 51 comprising two or more (i.e. four in the example of FIGS. 1A-1F) of mutually stacked strips 50 of basic material. The blanking device 90 includes four tool parts, namely a blanking punch 30, a counter punch 40, a blank holder 70 and a blanking die 80. The blank holder 70 and the blanking die 80 each define a respective cavity 71, 81, wherein the blanking punch 30 and the counter punch 40 are contained, which cavities 71, 81 are shaped to correspond to the metal part 1, i.e. to the 2D contour thereof. This particular type of blanking process/blanking device 90 using a counter punch 40 is known per se, namely as fine blanking.

In FIG. 1A, the blanking device 90 is shown in a first open state, wherein the blanking punch 30 is fully retracted into the blank holder 70, the counter punch 40 is fully retracted into the blanking die 80 and wherein the blank holder 70 and the blanking die 80 are separated from one another, at least sufficiently for allowing the layered basic material 51 to be inserted and/or advanced relative to the blanking device 90, as schematically indicated by the dashed arrow.

Figure 1B:
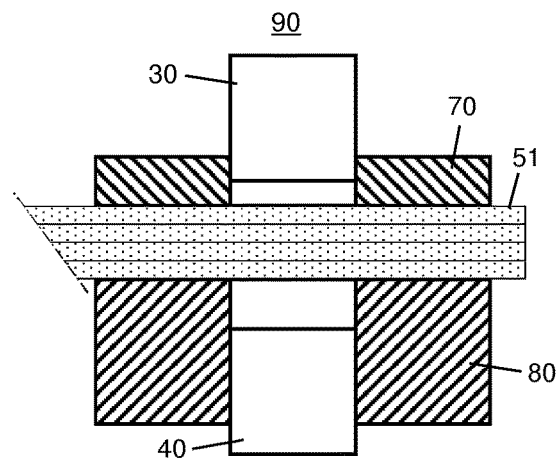

In FIG. 1B the blanking device 90 is shown after the blank holder 70 and the blanking die 80 have been moved towards each other to clamp the layered basic material 51 between them.

Figure 1C:
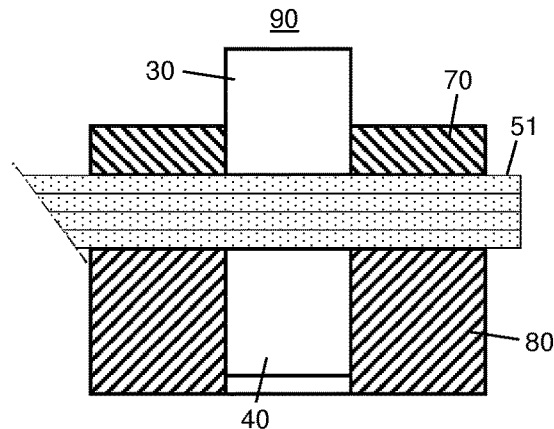

In FIG. 1C the blanking device 90 is shown after the blanking punch 30 and the counter punch 40 have been moved towards each other to also clamp the layered basic material 51 between them.

Figure 1D:
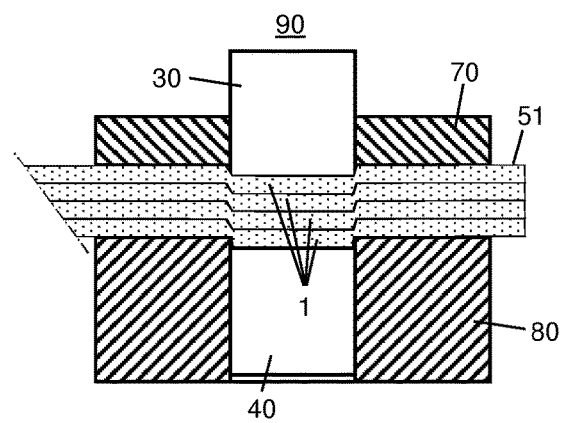
Figure 1E:
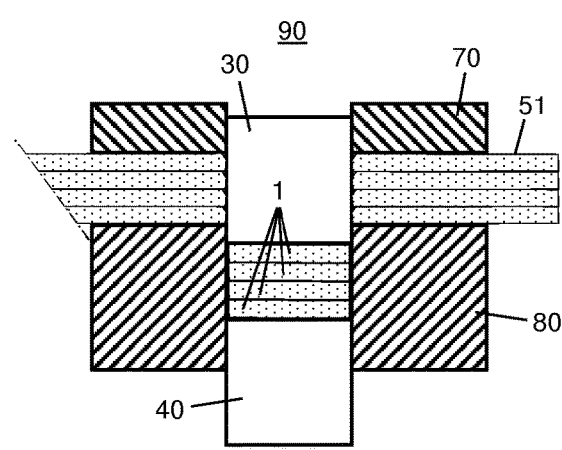

In FIGS. 1D and 1E the actual cutting out a number of the metal parts 1, as determined by the number of strips 50 of basic material of the layered basic material 51, by the forced relative movement of the combination of the blanking punch 30 and the counter punch 40 relative to the blanking die 80, is schematically illustrated. In particular in FIG. 1D the blanking device 90 is shown during the actual cutting and in FIG. 1E the blanking device 90 is shown after the metal parts 1 are cut completely, i.e. after these have been severed from the layered basic material 51, and are still held between the blanking punch 30 and the counter punch 40 inside the said cavity 81 of the blanking die 80.

Figure 1F:
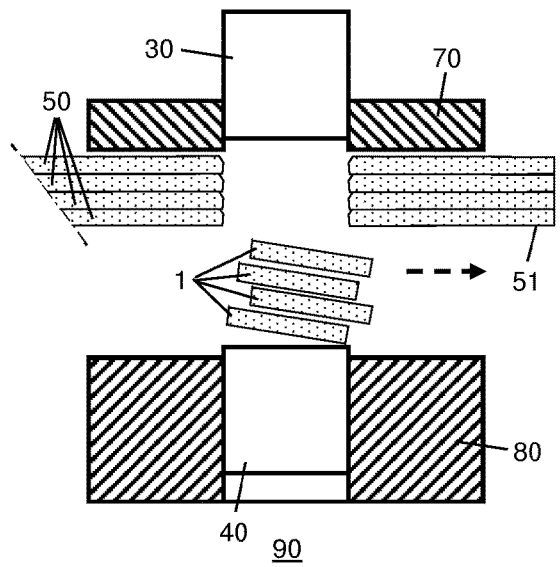

In FIG. 1F the blanking device 90 is shown in a second open state, wherein the blanking punch 30 is fully retracted into the blank holder 70, the layer basic material is lifted of the blanking die 80 and wherein the counter punch 40 protrudes from the blanking die 80 after pushing the metal parts 1 upwards out of the cavity 81 of the blanking die 80 to allow the extraction thereof from the blanking device 90. After such extraction, the blanking device 90 returns to its first open state shown in FIG. 1A etc.

Figure 2:
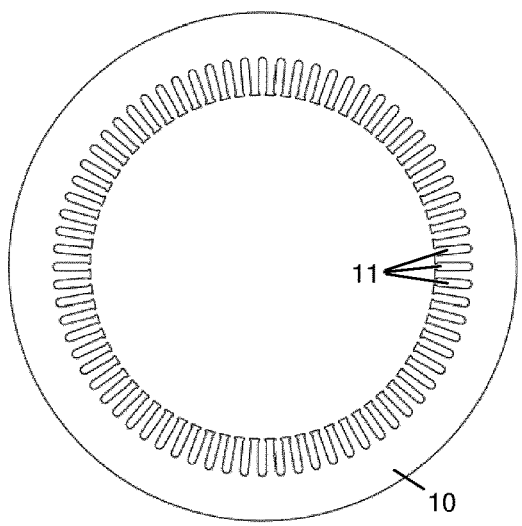
FIG. 2 illustrates an example of a blanked part, namely a stator ring of a stator lamination for an electric motor, that can be favourably produced with the multi-layer fine blanking process and device illustrated in FIGS. 1A to 1F.
Figure 3:
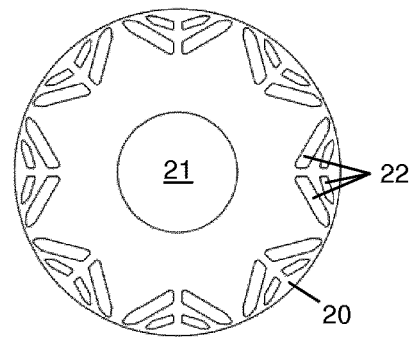
FIG. 3 illustrates another example of a blanked part, namely a rotor disc of a rotor lamination for an electric motor, that can be favourably produced with the multi-layer fine blanking process and device illustrated in FIGS. 1A to 1F.

FIGS. 2 and 3 provide examples of the metal part 1 that can be suitably produced with the aid of the multi-layer blanking process discussed herein. In the example of FIG. 2, the metal part 1 takes the form of a stator ring 10 for an electric motor. In the electric motor a number of such stator rings 10 are stacked and clamped or interconnected in axial direction to form a stator lamination. In the presently illustrated, non-limiting, example of the stator ring 10, it is shown to include a series of slots 11 that are arranged on and along its inner circumference. These slots 11 serve to accommodate windings of electric wire in the electric motor. In the example of FIG. 3, the metal part 1 takes the form of a rotor disc 20 of an electric motor. In the electric motor a number of such rotor discs 20 are stacked and clamped or interconnected in axial direction to form a rotor lamination. In the presently illustrated, non-limiting, example of the rotor disc 20, it is shown to include a central hole 21, for accommodating a rotor shaft that extends in axial direction through the whole of the rotor lamination while being fixed thereto, and a number of circumference holes 22, for accommodating permanent magnets that extend in axial direction through the whole of the rotor lamination.

Typically, the dimension of the stator ring 10 and/or of the rotor disc 20 in axial direction, i.e. its thickness that corresponds to the thickness of the strip 50 of basic material, is chosen small to minimise eddy current losses in the electric motor. However, in practice, a smallest achievable, i.e. minimum thickness applies from a process economics point of view, as well as in terms of the technical capability of the blanking process. Nevertheless, by utilising the above-described multi-layer fine blanking process such minimum thickness is smaller than what is achievable with the so-called conventional or progressive blanking process, wherein the counter punch 40 is omitted from the blanking device 90 and a blanked metal part 1 is discharged via the cavity 81 of the blanking die 80.

Figure 4:
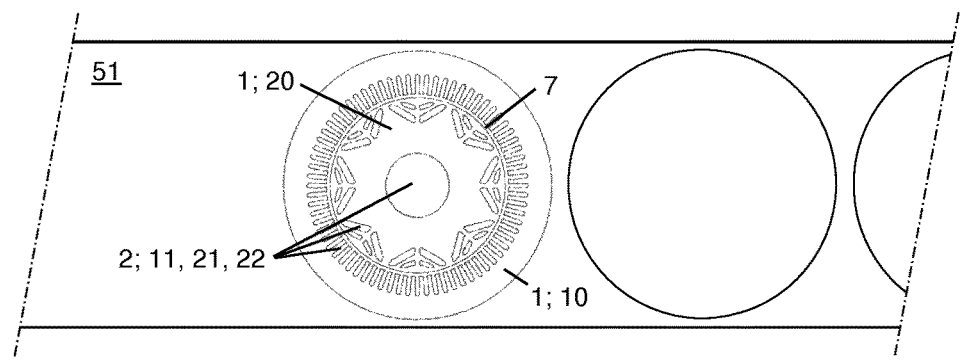
FIG. 4 schematically illustrates the stator ring and the rotor disc being blanked in a mutually nested, i.e. concentric arrangement of these metal parts from a strip of metal basic material.

In particular compared to the conventional blanking process, the said multi-layer fine blanking process comes with the limitation that after the cutting out of the metal parts 1; 10, 20, the scrap material from the cut slots 11 of the stator ring 10 or from the cut holes 21; 22 of the rotor disc 20, as well as the blanked metal parts 1; 10, 20 themselves are still held between the upper tool parts 30, 70 and the lower tool parts 40, 80 of the blanking device 90. As a result, complications arise in the extraction step illustrated in FIG. 1F, i.e. when removing all of the layers of the said scrap material and the metal parts 1 from the blanking device 90, in particular to remove these reliably, quickly and without damage. Removing the scrap material 2 and the blanked metal parts 1, 10; 20 in the said extraction step becomes even more complicated, almost impractical, when the rotor disc 20 is formed radially inside the stator ring 10, as illustrated in FIG. 4 in a frontal view of the layered basic material 51. In this nested arrangement of the rotor disc 20 and the stator ring 10, additionally a thin ring 7 of scrap material is to be removed from between them, further complicating the said extraction step. Still, such a nested arrangement is preferred in principle to optimise the utilisation rate of the strips 50 of basic material of the layered basic material 51.

As an improvement of the above-described known multi-layer fine blanking process, it is presently proposed to precede it by a multi-layer conventional blanking process. In other words the present disclosure provides for a novel multi-layer blanking process that is schematically illustrated in FIG. 5 by way of a possible embodiment of a novel blanking device 100 within the context of the present disclosure, which novel multi-layer blanking process is executed in at least two stages I and II.

In a first stage I of the novel multi-layer blanking process, a part or parts of the contour of the metal parts 1 is cut from the layered basic material 51 by conventional blanking, i.e. without applying a counter punch opposite a first blanking punch 31. In a second stage II of the novel multi-layer blanking process, a remaining part or parts of the contour of the metal parts 1 is cut from the layered basic material 51 by fine blanking, i.e. with applying a counter punch 40 opposite a second blanking punch 32. The contour part or parts that are cut in the said first stage I by the first blanking punch 31 represent holes 3 that are formed in the layered basic material 51 by removing correspondingly shaped pieces of scrap material 2. These pieces of scrap material 2 are removed from the layered basic material 51 by being ejected through the blanking die 80. In the said second stage II, the circumference of the metal parts 1 is formed, at least is completed by the second blanking punch 32. The thus finally formed metal parts 1 are extracted from between the second blanking punch 32 and the counter punch 40 after opening the novel blanking device 100 (see also FIG. 1F). In between the two blanking stages I, II, the blanking punches 31, 32 are retracted in the blank holder 70 and the layered basic material 51 is stepwise advanced in the direction from the first blanking station 101 towards a second blanking station 102.

Figure 5:
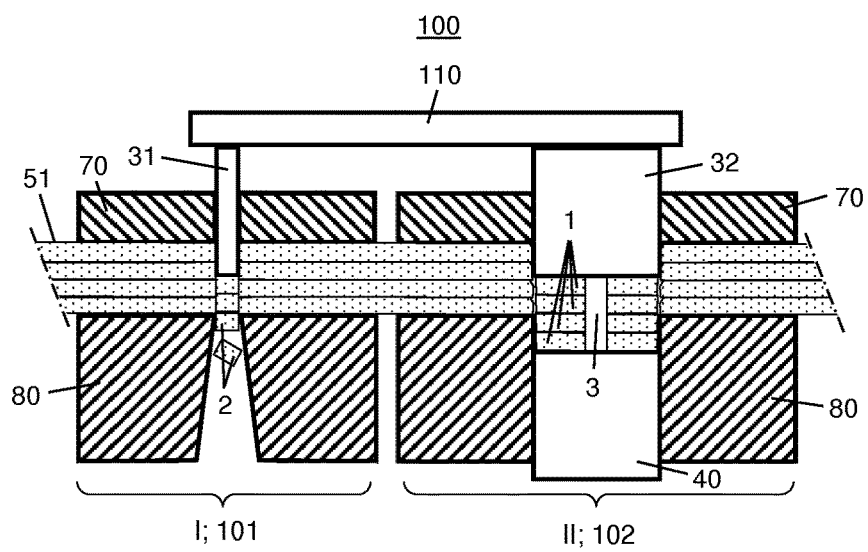
FIG. 5 schematically illustrate a novel multi-layer blanking process in a cross-section of a novel multi-layer blanking device.

Preferably and as illustrated in FIG. 5, the said two blanking stages I, II are carried out in subsequent blanking stations 101, 102 of the single novel blanking device 100 and the respective blanking punches 31, 32 are operated in common relative to the blanking dies 80, preferably by means of a single ram 110 of the device 100. In FIG. 5 the ram 110 is shown to act on and thus to move the blanking punches 31, 32, while the blanking dies 80 are fixed in place. However, since only the relative movement between the blanking punches 31, 32 and the blanking dies 80 is of concern, the ram 110 can just as well act on the blanking dies 80, while the blanking punches 31, 32 are fixed in place. Moreover, the novel blanking device 100 may also be embodied with separate rams for moving the respective blanking punches 31, 32 and/or the respective blanking dies 80 (embodiment not illustrated).

Further in relation to FIG. 5 it is noted that, generally speaking, in any blanking process the cut edges are formed relatively sharply on one side (the so-called burr side) of the blanked metal parts 1 and relatively smoothly/smoothly curved (the so-called rollover side) on the respective opposite side thereof. However, these burr and rollover sides are typically located on opposite sides of the metal parts 1 between the conventional and the fine blanking processes. In particular, in the first, conventional blanking stage I of the novel multi-layer blanking process, the rollover is formed on the side of the metal parts 1 facing upward in FIG. 5, i.e. towards the blank holder 70 and/or the first blanking punch 31 and the burr is formed on the side of the metal parts 1 facing downward towards the blanking die 80. On the other hand, in the second, fine blanking stage II of the novel multi-layer blanking process, the rollover is formed on the side of the metal parts 1 facing downward in FIG. 5, i.e. towards the blanking die 80 and/or counter punch 40 and the burr is formed on the side of the metal parts 1 facing upward towards the blank holder 70 and/or the second blanking punch 32.

Figure 6:
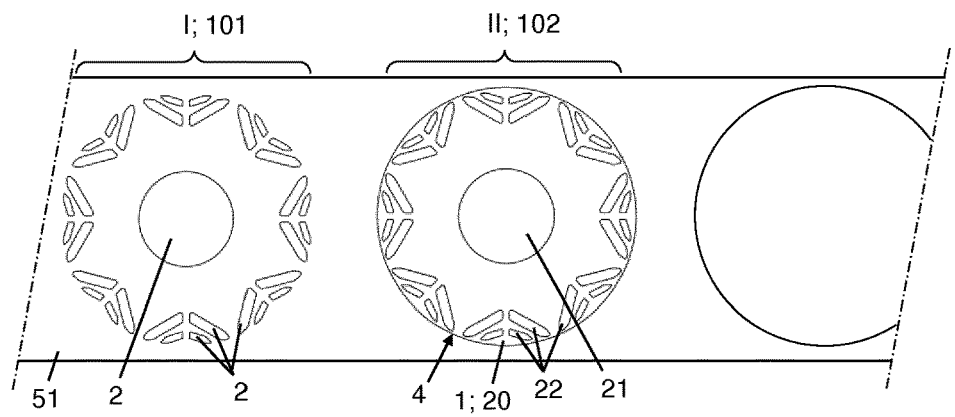
FIG. 6 schematically illustrates the blanking of the rotor disc by way of the novel multi-layer blanking process.

In FIG. 6, the novel multi-layer blanking process is schematically illustrated in a top view of the layered blanking basic material 51 in a first possible application thereof for the manufacture of the rotor disc 20. In the first stage I of the novel multi-layer blanking process, scrap material 2 is removed from the layer basic material 51 by the first blanking punch 31 to form the central hole 21 and the circumference holes 22 of the—still to be finally formed—rotor disc 20. In the second stage II of the novel multi-layer blanking process, the rotor disc 20 is formed while being supported by the counter punch 40, by the second blanking punch 32 cutting its outer circumference 4.

Figure 7:
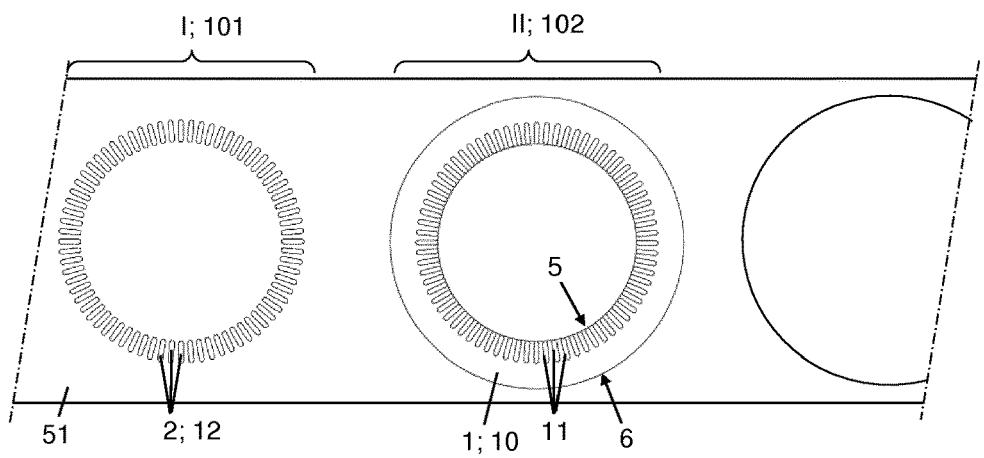
FIG. 7 schematically illustrates the blanking of the stator ring by way of the novel multi-layer blanking process.

In FIG. 7, the novel multi-layer blanking process is schematically illustrated in a top view of the layered blanking basic material 51 in a second possible application thereof for the manufacture of the stator ring 10. In the first stage I of the novel multi-layer blanking process, scrap material 2 is removed from the layer basic material 51 by the first blanking punch 31 to pre-form the slots 11 of the—still to be finally formed—stator ring 10 as separate, radially oriented holes 12. In the second stage II of this second possible application of novel multi-layer blanking process, the stator ring 10 is finally formed while being supported by the counter punch 40, by the second blanking punch 32 simultaneously cutting both the inner circumference 5 and the outer circumference 6 thereof. In this second stage II, the radial holes 12 representing the pre-formed slots 11 are opened up by the cutting of the inner circumference 5 of the stator ring 10.

Figure 8:
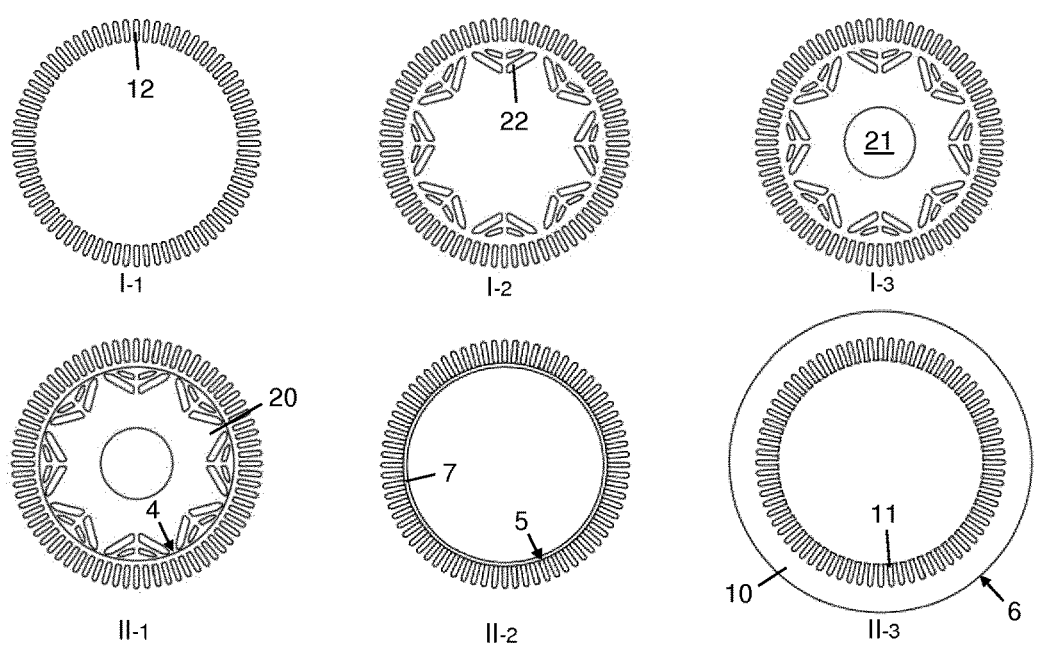
FIG. 8 schematically illustrates the stator ring and the rotor disc being blanked in a mutually nested, i.e. concentric arrangement of these metal parts by way of the novel multi-layer blanking process.

It is noted that the said first stage I of multi-layer conventional blanking and possibly also the said second stage II of multi-layer fine blanking can be subdivided into two or more sub-stages of the respective stage I, II. In such arrangement of the novel multi-layer blanking process a blanking sub-station is provided for each sub-stage. In particular in case of an end-product having a relatively complicated 2D contour it can be convenient or necessary even to carry out a respective stage I, II in two or more subsequent steps, i.e. sub-stages. For example, in case of the rotor discs 20 and the stator rings 10 of a specific end-product electric motor, these cannot easily be blanked from the layered basic material 51 in a mutually concentric placement, as is preferred in principle. This limitation occurs not only because the shape or 2D contour of these parts can be too complex to be fully incorporated into only the said first and second blanking punches 31, 21, but also because the scrap ring 7 has to be accurately formed—and removed from—between the rotor disc 20 and the stator ring 10 to provide a radial gap there between in the end-product electric motor. In FIG. 8 it is illustrated to subdivide both the first stage I and the second stage II of the novel multi-layer blanking process into three sub-stages $I_{-1}$, $I_{-2}$, $I_{-3}$ and $II_{-1}$, $II_{-2}$, $II_{-3}$. This particular, illustrated setup of the overall novel blanking process is, however, only an example: other subdivisions are conceivable.

In FIG. 8, in sub-stage $I_{-1}$ the slots 11 of the stator ring 10 are pre-formed as radial holes 12, in sub-stage $I_{-2}$ the circumference holes 22 of the rotor disc 20 are formed and in sub-stage $I_{-3}$ the central hole 21 of the rotor disc 20 is formed. In each such step of punching, the respective holes 12, 21, 22 are formed by means of a blanking punch, but without applying a counter punch. Also in FIG. 8, in sub-stage $II_{-1}$ the rotor disc 20 is blanked by cutting its outer circumference 4, in sub-stage $II_{-2}$ the scrap ring 7 is blanked by cutting its outer circumference 5 that corresponds to the inner circumference 5 of the stator ring 10 and in sub-stage $II_{-3}$ the stator ring 10 is blanked by cutting its outer circumference 6. In each step of blanking, the respective part 20, 7, 10 are formed by means of and while being held between a blanking punch and a counter punch.

As mentioned hereinabove, FIG. 8 represents only one possible embodiment of the novel blanking process. In particular some of the sub-stages illustrated in FIG. 8 could possibly be combined with another one, or could possibly be divided into further sub-stages. For example, the forming of the central hole 21 of the rotor discs 20 could potentially be included in either one of the sub-stages $I_{-1}$ and $I_{-2}$. Moreover, at least the final two sub-stages $II_{-2}$ and $II_{-3}$, however ideally all three of the shown sub-stages $II_{-1}$, $II_{-2}$ and $II_{-3}$ of the second blanking stage II are preferably carried out simultaneously, i.e. in a single blanking stroke.

If the final two sub-stages $II_{-2}$ and $II_{-3}$ that are illustrated separately in FIG. 8 are combined into one, it is preferable that the stator rings 10 are held between the second blanking punch 32 and the counter punch 40 and the scrap rings 7 are held between the blank holder 70 and the blanking die 80, rather than the other way round. In this case, the thin scrap rings 7 are preferably removed from the novel blanking device 100 before the stator rings 10. In particular, departing from the state of the novel blanking device 100 corresponding to FIG. 1E, first the upper tool parts 32, 70 of the novel blanking device 10 are moved relative to and away from its lower tool parts 40, 80, however, without raising the counter punch 40 relative to the blanking die 80. In this state of the novel blanking device 100 the scrap rings 7 can be removed, e.g. by a forced air flow. Only thereafter, the counter punch 40 is moved relative to the blanking die 80, to raise the stator rings 10 above the blanking die 80. In this state of the novel blanking device 100 that corresponds to the state illustrated in FIG. 1F, the stator rings 10 can be removed, preferably carefully for example by means of a mechanical gripper.

If all of the three sub-stages $II_{-1}$, $II_{-2}$ and $II_{-3}$ that are illustrated separately in FIG. 8 are combined into one, it is preferably that both the stator rings 10 and the rotor discs 20 are held between the second blanking punch 32 and the counter punch 40, rather than between the blank holder 70 and the blanking die 80. In this case and as part of the second blanking stage II, the scrap rings 7 are preferably removed first from the novel blanking device 100 in the above manner, i.e. by opening the novel blanking device 100 without raising the counter punch 40 relative to the blanking die 80. Thereafter, the stator rings 10 and the rotor discs 20 are preferably removed from the blanking device in succession by successively moving the counter punches 40 associated with the stator rings 10 and the rotor discs respectively and thus successively raising these above the blanking die 80 for their successive removal from the novel blanking device 100.

Furthermore, the above-discussed combinations of the sub-stages $II_{-1}$, $II_{-2}$ and $II_{-3}$ of the second blanking stage II, can be facilitated by either one or both of the following detailed features of the novel multi-layer blanking process according to the present disclosure.

Figure 9:
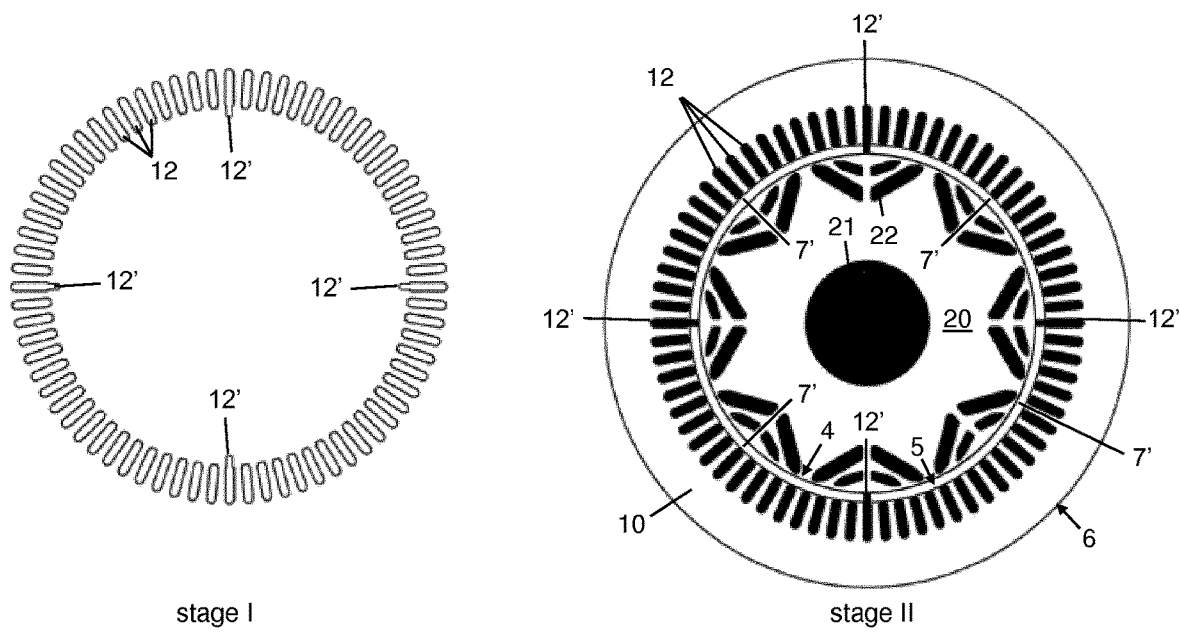
FIG. 9 schematically illustrates a first detailed feature of the novel multi-layer blanking process.

A first such detailed feature is illustrated in FIG. 9. This first detailed feature entails the extension of a number of the radial holes 12 that are cut in the first blanking stage I in radial inward direction. In particular, such an extended radial hole 12' is dimensioned to fully, or at least almost fully, bridge the radial gap between the stator ring 10 and the rotor disc 20 that will be cut later in the second blanking stage II. It is noted that in the illustration of the second blanking stage II in FIG. 9, the holes 12, 12' formed in the first blanking stage I are drawn in solid black.

In this particular arrangement of the multi-layer blanking process, when the outer circumference 4 of the rotor disc 20 and the inner circumference 5 of the stator ring 10 are cut, the ring-shaped scrap material between the rotor disc 20 and the stator ring 10 does not form a closed ring, but rather one or more scrap ring sections or fragments 7'. According to the present disclosure, such scrap ring fragments 7' are easier to remove from the novel blanking device 100, i.e. from in-between the blank holder 70 and the blanking die 80, than a closed ring that can hook around an edge or other protruding part of the novel blanking device 100. Obviously, the number of scrap ring fragments 7' formed in the second blanking stage II corresponds to the number of extended radial holes 12' applied in the first blanking stage I. Preferably, the extended radial holes 12' are approximately equally distributed amongst the total number of radial holes 12. Preferably also, the number of extended radial holes 12' is between 2 and 10. Obviously, with only 1 extended radial hole 12', only one scrap ring fragment 7' is formed that is still relatively unfavourable to remove from blanking device 9. However, as the number of extended radial holes 12' increases, the scrap ring fragments 7' formed become smaller, which can complicate the removal thereof as well.

Figure 10:
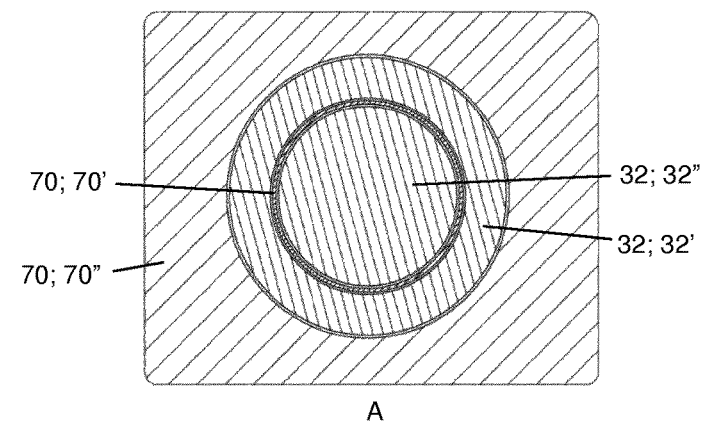
FIG. 10 schematically illustrates a second detailed feature of the novel multi-layer blanking process.
Figure 10:
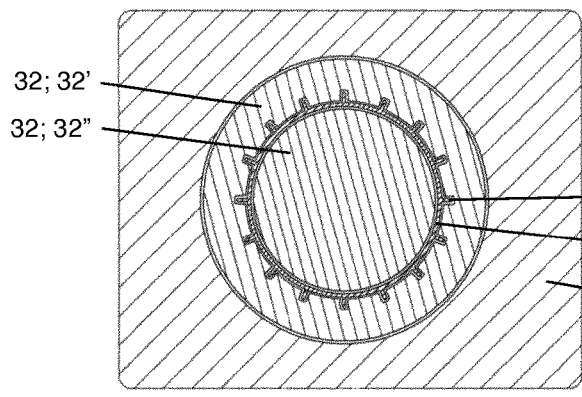
Figure 10:
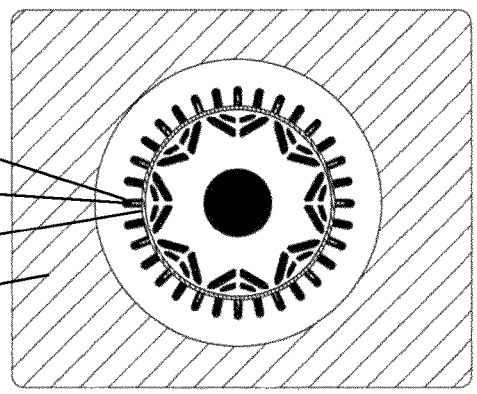

A second detailed feature of the novel multi-layer blanking process according to the present disclosure is illustrated in FIG. 10. This second detailed feature entails the provision of radially extending reinforcement ribs 72 to a relatively thin, cylindrically-shaped tool part (or tool parts) 70' of the novel blanking device 100 that acts against the layered basic material 51 in the radial gap between the stator ring 10 and the rotor disc 20 to be formed, i.e. which blanking tool part 70' supports the said scrap rings 7 (or the scrap ring fragments 7') as these are cut loose from the rest of the layered basic material 51 in the second blanking stage II. Thus, in the above-mentioned preferred arrangement of the blanking device wherein the scrap rings 7 are held between the blank holder 70 and the blanking die 80, the said blanking tool part 70' provided with the reinforcement ribs 72 corresponds to at least a part of either the blank holder 70, the blanking die 80 or both. However, in principle, it is also possible to arrange the second blanking stage II of the novel multi-layer blanking process such that the scrap rings 7 are held between the second blanking punch 32 and the counter punch 40, in which case the reinforcement ribs 72 are provided to either one of the second blanking punch 32, the counter punch 40 or both.

As illustrated in FIG. 10-A, in a cross section of the novel blanking device 100, the relatively thin, cylindrically-shaped part 70' of the blank holder 70 is located between two second blanking punches 32', 32" of the second blanking station 102 that respectively act on the rotor discs 20 and on the stator rings 10. The said cylindrically-shaped blank holder part 70' thus supports the scrap rings 7 in the second blanking stage II. A further part 70" of the blank holder 70 encloses all three aforementioned blanking tool parts 32', 32", 70' of the novel blanking device 100. Axially opposite the cylindrically-shaped blank holder part 70', a likewise thin and cylindrically-shaped part of the blanking die 80 is located (not shown). The thickness of these cylindrically-shaped parts 70' of the blanking holder 70 and the blanking die 80 respectively, are bound to a minimum by the required strength and rigidity thereof, such that the (minimum) width of the scrap ring 7 and the radial gap between the rotor and stator laminations are similarly bound.

According to the present disclosure, the strength and rigidity of at least the blank holder 70 and preferably also the blanking die 80, can be favourably improved by providing the respective cylindrically-shaped part 70' thereof with radially oriented reinforcement ribs 72, whereof a tangential placement corresponds to that of the radial holes 12 that were cut in layered basic material 51 in the first blanking stage I to pre-form the radial slots 11 on the inner circumference of the stator discs 10. This second detailed feature is schematically illustrated in FIGS. 10-B and 10-C, whereof FIG. 10-C does not include the said two second blanking punches 32', 32" to make visible the layered basic material 51 located there below.

Obviously, the reinforcement ribs 72 are highly advantageous in strengthening the blank holder 70 and thereby allow the cylindrically-shaped part 70' thereof to be provided with a minimal width, which favourably translates to the scrap ring 7 and the air gap likewise having a minimal width. This second detailed feature makes favourable use of the two stage approach of the novel multi-layer blanking process according to the present disclosure. Preferably, the reinforcement ribs 72 are each dimensioned somewhat smaller than a corresponding radial hole 12 to avoid interference with the cut edges thereof. Moreover, not every radial hole 12 needs to utilised this way, i.e. the number of the reinforcement ribs 72 may be smaller than the number of radial holes 12, as is indeed the case in FIG. 10-C.

It is noted that in the embodiments of the rotor and stator laminations that are illustrated in the attached drawing figures, the stator rings 10 are provided with the radially extending slots 11 and the rotor discs 20 are not. However, it is also known to provide the rotor discs 20 with radial extending slots on their outer circumference. In such latter embodiment, the radial holes representing such rotor slots would be extended in radial outward direction when embodying the first detailed feature above and/or the reinforcement ribs 72 of the blank holder 70 would be extended in radial inward direction from the cylindrically-shaped blank holder part 70' when embodying the second detailed feature above.

The present disclosure, in addition to the entirety of the preceding description and all details of the accompanying drawings, also concerns and includes all the features of the appended set of claims. Bracketed references in the claims do not limit the scope thereof, but are merely provided as non-binding examples of the respective features. The claimed features can be applied separately in a given product or a given process, as the case may be, but it is also possible to apply any combination of two or more of such features therein.

The invention(s) represented by the present disclosure is (are) not limited to the embodiments and/or the examples that are explicitly mentioned herein, but also encompasses amendments, modifications and practical applications thereof, in particular those that lie within reach of the person skilled in the relevant art.

What is claimed is:

1. A process for the blanking of metal parts (1; 10, 20) from a layered basic material (51), the process operatively associated with blanking stations (101, 102), and the metal parts (1: 10, 20) provided with at least one of one or more holes (21, 22) and one or more slots (11), wherein the metal parts (1; 10, 20) are blanked from the layered basic material (51) with the aid of a blanking station (102), the process comprising steps of:

providing the blanking station (102) with a blank holder (70) and with a blanking die (80), each of which defines a cavity (71; 81) with a contour shape corresponding to that of the metal parts (1; 10, 20) to be blanked, and further providing the blanking station (102) with a blanking punch (32) and a counter punch (40) contained therein, wherein the blank holder (70) and the blanking die (80), on one hand, and the blanking punch (32) and the counter punch (40), on other hand, are movable with respect to each other, wherein the layered basic material (51) is first clamped between the blank holder (70) and the blanking die (80) on the one hand and the blanking punch (32) and the counter punch (40) on the other hand and, thereafter, the blanking punch (32) is moved through the successive layers (50) of the layered basic material (51) while supported by the counter punch (40), and thereby, the blanking punch (32) cuts loose a single metal part (1; 10, 20) of metal parts (1; 10, 20) from the surrounding basic material (51), wherein, prior to such cutting loose of the metal parts (1; 10, 20), the at least one of one or more holes (21, 22) and the one or more slots (11) are punched into the layered base material (51) with the aid of a further blanking station (101), the further blanking station (101) being provided with a further blank holder (70) and with a further blanking die (80), each of which defining an opening with a contour shape corresponding to that of the at least one of one or more holes (21, 22) and one or more slots (11) to be punched, and the further blanking station (101) being provided with a further blanking punch (31) contained therein, wherein the further blank holder (70) and the further blanking die (80) are movable with respect to the further blanking punch (31), to which end the layered base material (51) is first clamped between the further blank holder (70) and the further blanking die (80) and, thereafter, the further blanking punch (31) is moved through the successive layers (50) of the layered basic material (51) and thereby cuts loose a piece of scrap material (2) from the surrounding basic material (51) without utilizing a counter punch.

2. The process for the blanking of metal parts (1; 10, 20) from layered basic material (51) according to claim 1, wherein the process further comprises removing the scrap material (2) from the further blanking station (101) through the opening in the further blanking die (80).

3. The process for the blanking of metal parts (1; 10, 20) from layered basic material (51) according to claim 1, wherein the layered basic material (51) is composed of a number of mutually stacked, individual layers (50) with at least one of a mutually corresponding thickness and a mutually corresponding material composition.

4. The process for the blanking of metal parts (1; 10, 20) from layered basic material (51) according to claim 1, wherein at least some of the at least one of one or more holes (21, 22) and one or more slots (11) that are punched in the basic material (51) with the aid of the further blanking station (101) are used to position the layered basic material (51) at a location of the blanking station (102) relative to, at least, the blanking die (80) thereof.

5. The process for the blanking of metal parts (1; 10, 20) from layered basic material (51) according to claim 4, wherein the blanking die (80) of the blanking station (102) is provided with pilot pins that are inserted in the at least one of one or more holes (21, 22) and one or more slots (11).

6. The process for the blanking of metal parts (1; 10, 20) from layered basic material (51) according to claim 1, wherein the metal parts (1; 10, 20) are provided with slots (11) on a circumference (4; 5) thereof, wherein the slots (11) are first pre-formed as holes (12, 12') with the aid of the further blanking station (101) and, thereafter, are cut open with the aid of the blanking station (102), simultaneously with the cutting loose of a respective circumference (4, 5) of the metal parts (1; 10, 20) by the blanking station (102).

7. The process for the blanking of metal parts (1; 10, 20) from layered basic material (51) according to claim 6, wherein parts (70') of the blanking punch (32), the counter punch (40), the blank holder (70) or the blanking die (80) of the blanking station (102) extend in a radial direction into the pre-formed holes (12, 12').

8. The process for the blanking of metal parts (1; 10, 20) from layered basic material (51) according to claim 1, wherein the metal parts (1; 10, 20) are rotor discs (20) and stator rings (10) for an electric motor, wherein each rotor disc (20) is formed radially inside a respective stator ring (20), wherein both an outer circumference (4) of the rotor disc (20) and an inner circumference (5) of the stator ring (10) are simultaneously cut loose with the aid of the blanking station (102), thereby forming a ring (7) of scrap material between the outer circumference (4) of the rotor disc (20) and the inner circumference of the stator ring (10).

9. The process for the blanking of metal parts (1; 10, 20) from layered basic material (51) according to claim 8, wherein the outer circumference (4) of the rotor discs (20) or the inner circumference (5) of the stator rings (10) is provided with slots (11) that are pre-formed as holes (12, 12') with the aid of the further blanking station (101), the pre-formed holes (12, 12') are then cut open with the aid of the first mentioned blanking station (102) to form the slots (11), wherein at least some of the pre-formed holes (12, 12') extend in a radial direction beyond the relevant slot (11) to be formed.

10. The process for the blanking of metal parts (1; 10, 20) from layered basic material (51) according to claim 9, wherein at least some of the pre-formed holes (12, 12') extend in a radial direction to the outer circumference (5) of the rotor discs (20) or the inner circumference (5) of the stator rings (10), respectively, and thereby fully or partly cut through the scrap material ring (7).

11. The process for the blanking of metal parts (1; 10, 20) from layered basic material (51) according to claim 8, wherein the blanking station (102) comprises three subsequent blanking sub-stations, wherein a first sub-station cuts loose and removes the rotor discs (20) from the layered basic material (51), wherein a second sub-station cuts loose and removes the scrap material rings (7) from the layered basic material (51), and wherein a third sub-station cuts loose and removes the stator rings (10) from the layered basic material (51).

12. The process for the blanking of metal parts (1; 10, 20) from layered basic material (51) according to claim 8, wherein the blanking station (102) comprises two subsequent blanking sub-stations, wherein a first sub-station cuts loose and removes the rotor discs (20) from the layered basic material (51) and wherein a second sub-station cuts loose and removes the stator rings (10) from the layered basic material (51), the two subsequent blanking sub-stations forming the scrap material rings (7) between the blank holder (70) and the blanking die (80), and, thereafter, the combination of the further blanking punch (31) and the blank holder (10) and the combination of the counter punch (40) and the blanking die (80) are moved away from each other, whereafter the scrap material rings (7) are taken out of the blanking station (102) and, subsequently, the counter punch (40) is moved relative to the blanking die (80) in order to press the stator rings (10) out of the cavity (81) of the blanking die (80), whereafter the stator rings (10) are taken out of the blanking station (102).

13. The process for the blanking of metal parts (1; 10, 20) from layered basic material (51) according to claim 8, wherein the blanking station (102) cuts loose the stator rings (10) and the rotor discs (20) simultaneously from the layered basic material (51), forming the rings (7) between the blank holder (70) and the blanking die (80), and, thereafter, the combination of the further blanking punch (31) and the blank holder (10) and the combination of the counter punch (40) and the blanking die (80) are moved away from each other, whereafter the scrap material rings (7) are taken out of the blanking station (102) and, subsequently, the counter punch (40) is moved relative to the blanking die (80) in order to press the stator rings (10) out of the cavity (81) of the blanking die (80), whereafter the stator rings (10) are taken out of the blanking station (102).

14. The process for the blanking of metal parts (1; 10, 20) from layered basic material (51) according to claim 8, wherein the outer circumference (4) of the rotor discs (20) or the inner circumference (5) of the stator rings (10) is provided with slots (11), wherein the slots (11) are first pre-formed as holes (12, 12') with the aid of the further blanking station (101) and, thereafter, are cut open with the aid of the blanking station (102), wherein the blanking punch (32), the counter punch (40), the blank holder (70) or the blanking die (80) of the blanking station (102) is provided with radially oriented reinforcement ribs, wherein a tangential placement of each one of the radially oriented reinforcement ribs corresponds to a placement of a respective one of the pre-formed holes (12, 12').

\* \* \* \* \*